United States Patent
Sokolov et al.

(10) Patent No.: US 7,922,339 B2
(45) Date of Patent: Apr. 12, 2011

(54) COMPACT REAR PROJECTION DISPLAY

(75) Inventors: Kirill Sokolov, Suwon-si (KR);
Tae-hong Jeong, Yongin-si (KR);
Young-chol Lee, Gunpo-si (KR); Alexei Borodouline, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 832 days.

(21) Appl. No.: 11/603,203

(22) Filed: Nov. 22, 2006

(65) Prior Publication Data

US 2007/0153242 A1 Jul. 5, 2007

(30) Foreign Application Priority Data

Nov. 22, 2005 (KR) .................. 10-2005-0112006

(51) Int. Cl.
*G03B 21/28* (2006.01)
(52) U.S. Cl. ..................................... 353/98
(58) Field of Classification Search ............ 353/74–79, 353/98, 99; 362/602, 604, 610, 612, 559, 362/560, 511, 530; 349/62; 385/31, 129–132, 385/146
See application file for complete search history.

(56) References Cited

U.S. PATENT DOCUMENTS

| | | | |
|---|---|---|---|
| 5,381,502 A * | 1/1995 | Veligdan ................. 385/115 |
| 5,390,085 A * | 2/1995 | Mari-Roca et al. ......... 362/609 |
| 5,455,882 A * | 10/1995 | Veligdan ................. 385/116 |
| 5,613,751 A * | 3/1997 | Parker et al. ............. 362/627 |
| 5,625,736 A | 4/1997 | Veligdan |
| 5,745,266 A * | 4/1998 | Smith ................... 359/34 |
| 6,002,826 A * | 12/1999 | Veligdan ................. 385/120 |
| 6,184,943 B1 | 2/2001 | Sellers |
| 6,222,971 B1 * | 4/2001 | Veligdan et al. .......... 385/120 |
| 6,406,150 B1 * | 6/2002 | Burstyn .................. 353/69 |
| 6,452,577 B1 * | 9/2002 | Gale et al. .............. 345/87 |
| 6,464,358 B1 * | 10/2002 | Shirakura et al. .......... 353/7 |
| 6,525,750 B1 | 2/2003 | Knox |
| 6,561,649 B1 * | 5/2003 | Burstyn .................. 353/8 |
| 6,637,896 B2 | 10/2003 | Li et al. |
| 6,755,534 B2 * | 6/2004 | Veligdan et al. ........... 353/38 |
| 6,755,547 B2 * | 6/2004 | Parker ................... 362/618 |
| 6,791,628 B1 | 9/2004 | Sellers |

(Continued)

FOREIGN PATENT DOCUMENTS

EP 0888005 A2 12/1998

(Continued)

OTHER PUBLICATIONS

Travis, Adrian et al: "P-127: Linearity in Flat Panel Wedge Projection", SID 03 Digest, col. XXXIV, 2003, p. 176, XP007008450.

*Primary Examiner* — Thanh X Luu
*Assistant Examiner* — Danell L Owens
(74) *Attorney, Agent, or Firm* — Sughrue Mion, PLLC

(57) ABSTRACT

A compact rear projection display which can be used in mobile devices is provided. The compact rear projection display includes a main body unit which generates image signals, an image providing unit which forms and projects an image according to the image signals received from the main body unit, a transparent light guide plate, and a screen disposed at a surface of the transparent light guide plate. The transparent light guide plate guides the image incident from the image providing unit to be displayed on the screen.

22 Claims, 10 Drawing Sheets

U.S. PATENT DOCUMENTS

| | | | |
|---|---|---|---|
| 6,791,773 B2* | 9/2004 | Nagaoka | 359/833 |
| 6,825,987 B2* | 11/2004 | Repetto et al. | 359/633 |
| 6,832,727 B2* | 12/2004 | Veligdan | 235/462.32 |
| 6,870,671 B2* | 3/2005 | Travis | 359/443 |
| 6,883,919 B2* | 4/2005 | Travis | 353/81 |
| 6,903,881 B2* | 6/2005 | Baba | 359/733 |
| 7,048,388 B2* | 5/2006 | Takaura et al. | 353/99 |
| 7,101,048 B2* | 9/2006 | Travis | 353/69 |
| 7,110,796 B2* | 9/2006 | Lee | 455/566 |
| 7,222,969 B2* | 5/2007 | Veligdan | 353/37 |
| 7,230,758 B2* | 6/2007 | Huang | 359/457 |
| 7,239,452 B2* | 7/2007 | Kuwa | 359/649 |
| 7,256,951 B2* | 8/2007 | Naberhuis et al. | 359/802 |
| 7,397,984 B2* | 7/2008 | Kuo et al. | 385/33 |
| 7,453,638 B2* | 11/2008 | Sekiguchi | 359/457 |
| 7,503,661 B2* | 3/2009 | Masubuchi et al. | 353/99 |
| 2002/0018307 A1* | 2/2002 | Nagaoka | 359/833 |
| 2002/0050523 A1* | 5/2002 | Veligdan | 235/462.07 |
| 2002/0181130 A1* | 12/2002 | Ohzawa | 359/857 |
| 2003/0038924 A1* | 2/2003 | Veligdan et al. | 353/38 |
| 2004/0046944 A1* | 3/2004 | Suzuki et al. | 353/77 |
| 2004/0095560 A1* | 5/2004 | Travis et al. | 353/79 |
| 2006/0077567 A1* | 4/2006 | Matsuo | 359/726 |
| 2006/0114430 A1* | 6/2006 | Masubuchi et al. | 353/99 |
| 2006/0176556 A1* | 8/2006 | Kuo et al. | 359/460 |
| 2006/0176579 A1* | 8/2006 | Kuwa | 359/727 |
| 2007/0091431 A1* | 4/2007 | Mezouari et al. | 359/449 |
| 2007/0216877 A1* | 9/2007 | Sacre et al. | 353/97 |
| 2008/0094586 A1* | 4/2008 | Hirayama | 353/98 |
| 2008/0247150 A1* | 10/2008 | Itoh et al. | 362/19 |

FOREIGN PATENT DOCUMENTS

| | | |
|---|---|---|
| JP | 7-295678 A | 11/1995 |
| KR | 1998-055086 A | 9/1998 |
| KR | 10-2004-0103538 A | 12/2004 |
| WO | 01/05146 A1 | 1/2001 |
| WO | 01/56275 A2 | 8/2001 |
| WO | 03/027754 A1 | 4/2003 |

* cited by examiner

COMPACT REAR PROJECTION DISPLAY

CROSS-REFERENCE TO RELATED PATENT APPLICATION

This application claims the benefit of Korean Patent Application No. 10-2005-0112006 filed on Nov. 22, 2005 in the Korean Intellectual Property Office, the disclosure of which is incorporated herein in its entirety by reference.

BACKGROUND OF THE INVENTION

1. Field of the Invention

Apparatuses consistent with the present invention relate to a rear projection display, and more particularly, to a compact, small, thin rear projection display for use in mobile devices.

2. Description of the Related Art

Generally, mobile devices such as laptop computers, personal digital assistants (PDAs), and cell phones use liquid crystal displays (LCDs) or organic light-emitting devices (OLEDs), which are thin and light and have low power consumption. However, display devices, such as LCDs or OLEDs, include a rim portion around an image displaying area, where an image is not displayed, where driving circuitry is mounted. For example, cell phones or laptop computers include a display in a cover unit which is connected to a main body unit in which a main board and a keypad are installed. The image displaying area is only 60 to 80% of the entire area of the cover unit. Thus, it is difficult to increase the size of the display.

Accordingly, a technique of utilizing almost the entire surface of the cover unit as an image displaying area by employing front or rear projection displays in mobile devices, such as, laptop computers, PDAs, or cell phones, has been under development. Furthermore, in view of recent mobile multimedia broadcasting services like digital multimedia broadcasting (DMB), the displays of small mobile devices like cell phones should be enlarged as much as possible.

FIGS. 1 through 3B illustrate conventional rear projection displays that can be used in such mobile devices. FIG. 1 illustrates a projection display for computers disclosed in U.S. Pat. No. 6,525,750. Referring to FIG. 1, in the conventional rear projection display, an image signal generated in a main body 10 is transmitted to a projector 11 placed in an upper portion of a screen 15 through a cable 12. The projector 11 generates an image according to the image signal and projects the image on a magnifying mirror 14. Then the image is magnified by the magnifying mirror 14 and projected onto the screen 15. When not used, the magnifying mirror 14 can be retracted into the main body 10 by a tray 13.

FIG. 2 illustrates a "compact projection system" disclosed in U.S. Pat. No. 6,637,896. Referring to FIG. 2, a projector 21 is installed at a side of a main body 20, such as a cell phone, by a retractable connecting member 22. Furthermore, a foldable screen 23 is installed in an upper portion of the main body 20. An image signal generated in the main body 20 is transmitted to a projector 21 via the retractable connecting member 22, and the projector 21 projects an image to the foldable screen 23. When not used, the foldable screen 23 can be folded over a top surface 24 of the main body 20.

FIGS. 3A and 3B illustrate a "flat panel display" disclosed in U.S. Pat. No. 6,870,671. Referring to FIG. 3A, an image projected by a projector 31 is incident on a side of a transparent plate 33 through a mirror 32 and travels inside the transparent plate 33 by total internal reflection. Then, the image is incident on a side of a tapered glass 36 through a cylindrical lens 34. Mirrors 35a and 35b are attached to top and bottom surfaces of the cylindrical lens 34 to prevent the image from being emitted to the outside. As illustrated in FIG. 3B, since the glass 36 is tapered, a portion of the image traveling within the glass 36 does not satisfy the total internal reflection condition. Thus, the portion of the image which is not under the total internal reflection condition is emitted to the top surface of the glass 36. Accordingly, the image can be observed through a screen 37 formed on the top surface of the tapered glass 36.

However, during assembly of each of the above-described conventional small-sized rear projection displays, it is difficult to accurately arrange the components thereof. Also, the conventional projection displays illustrated in FIGS. 1 and 2 may easily break down because the mirror 14 and the projector 21 are retractable. Moreover, in order to display an image accurately, the mirror 14 and the projector 21 should be fixed at accurate positions, and the screens 15 and 23 facing the mirror 14 and the projector 21, respectively, should be erected at exact angles. In the conventional projection display illustrated in FIG. 3, a coating layer having a complex structure should be formed on a tapered surface of the glass 36 so that an image can be emitted from an accurate location on the tapered surface.

SUMMARY OF THE INVENTION

The present invention provides a compact rear projection display having a simple structure which can accommodate all components thereof.

According to an exemplary aspect of the present invention, there is provided a rear projection display comprising: a main body unit which generates image signals; an image providing unit which forms and projects an image according to the image signals received from the main body unit; a transparent light guide plate; and a screen formed at a side of the transparent light guide plate. The light guide plate guides the image received from the image providing unit to be displayed on the screen.

The transparent light guide plate may comprise: an image incidence surface through which the image projected by the image providing unit is incident; a magnifying reflection surface, facing the image incidence surface, which magnifies and reflects the image incident through the image incidence surface; and a total reflection surface, facing the screen and parallel to the screen, which totally internally reflects the image reflected by the magnifying reflection surface toward the screen.

The image incidence surface and the magnifying reflection surface may face each other at one end of the transparent light guide plate.

The image incidence surface may be spherical or aspherical, and the magnifying reflection surface may be aspherical to compensate for distortion of the image.

The screen may be formed directly on a surface of the transparent light guide plate or may be attached to the surface of the transparent light guide plate with an adhesive member. The screen may be one of a light diffusion plate, a total internal reflection (TIR) prism array, and a hologram pattern.

The image providing unit may comprise: a light source; a light modulator which modulates light emitted from the light source according to an image signal received from the main body unit to form an image; an illumination optical system disposed between the light source and the light modulator, which uniformly irradiates the light emitted from the light source to the light modulator; and a projection optical system which projects the image formed in the light modulator.

The image providing unit may further comprise a folding mirror which reflects the image projected by the projection optical system to the image incidence surface of the transparent light guide plate.

A connector may rotatably connect the transparent light guide plate to the main body unit, such that the transparent light guide plate may be in a first position, at a predetermined angle with respect to the main body unit, or a second position, in which the transparent light guide plate is folded over a top surface of the main body unit.

The main body unit may be one of a cell phone, a personal digital assistant (PDA), a laptop computer or a palmtop computer.

According to another exemplary aspect of the present invention, there is provided a rear projection display comprising: a main body unit which generates image signals; an image providing unit which forms an image according to the image signals received from the main body unit; a flat transparent light guide plate. The transparent light guide plate comprises a screen disposed at a surface of the transparent light guide plate; an image incidence surface, disposed at a first end of the transparent light guide plate, through which the image projected by the image providing unit is incident; a first reflection surface, facing the incident surface at the first end of the transparent light guide plate, which reflects the image incident through the incidence surface; a second reflection surface, facing the first reflecting surface and disposed at a second end of the transparent light guide plate, which reflects the image reflected by the first reflection surface; and a mirror array facing the screen, which reflects the image reflected by the second reflection surface to the screen, whereby the image is incident ton the screen at a right angle thereto.

The image incidence surface may be spherical or aspherical.

The first and second reflection surfaces may be aspherical to compensate for image distortion, the first reflection surface may be convex, and the second reflection surface may be concave.

The mirror array facing the screen may be one of a saw-like mirror array and a Fresnel lens type mirror array.

The screen may be directly formed on a surface of the transparent light guide plate or may be attached to the surface of the transparent light guide plate with an adhesive member. The screen may be one of a light diffusion plate, a TIR prism array, a hologram pattern, a lenticular screen and a micro lens screen.

BRIEF DESCRIPTION OF THE DRAWINGS

The above and other exemplary aspects of the present invention will become more apparent from the following detailed description of exemplary embodiments of the present invention with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
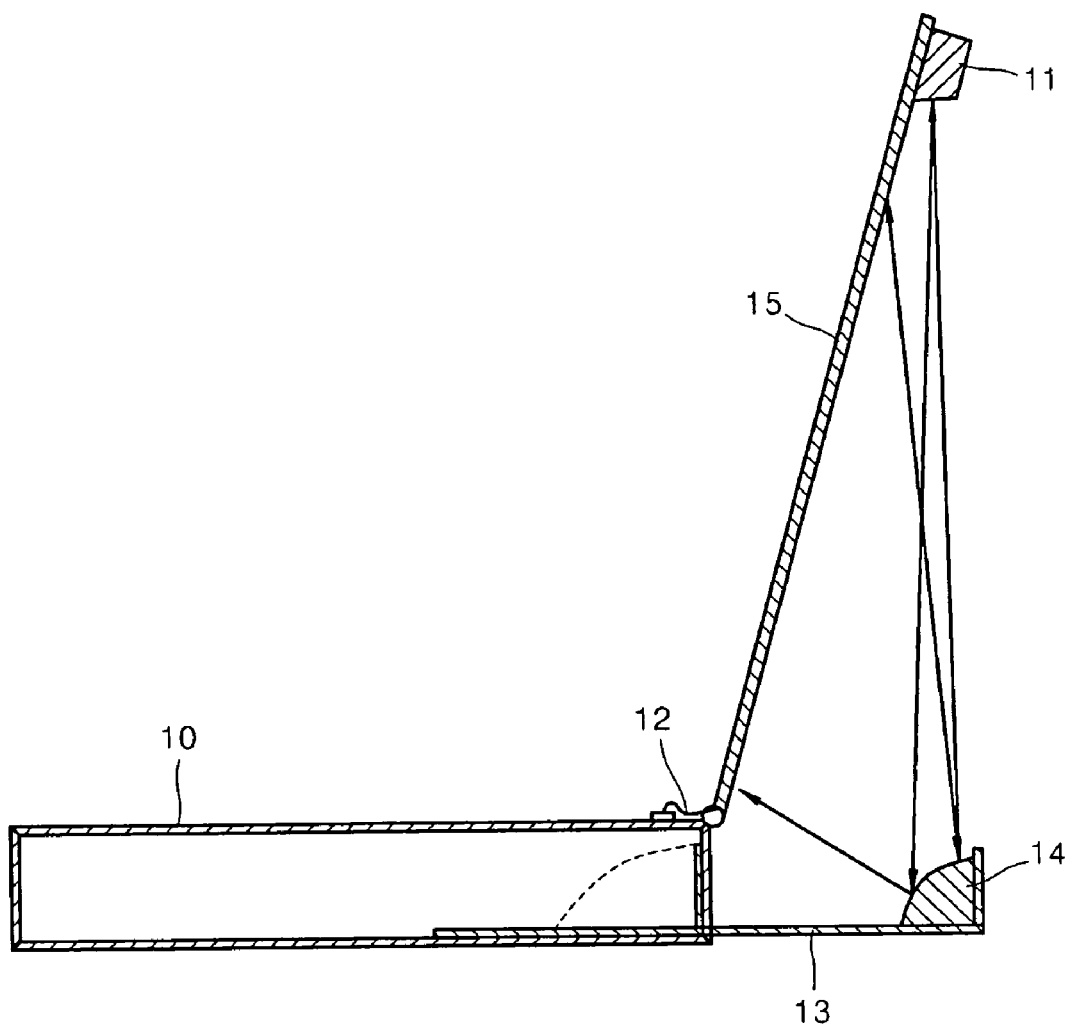
FIGS. 1 through 3B are schematic views of conventional small-size rear projection displays used in laptop computers or other mobile devices.
Figure 2:
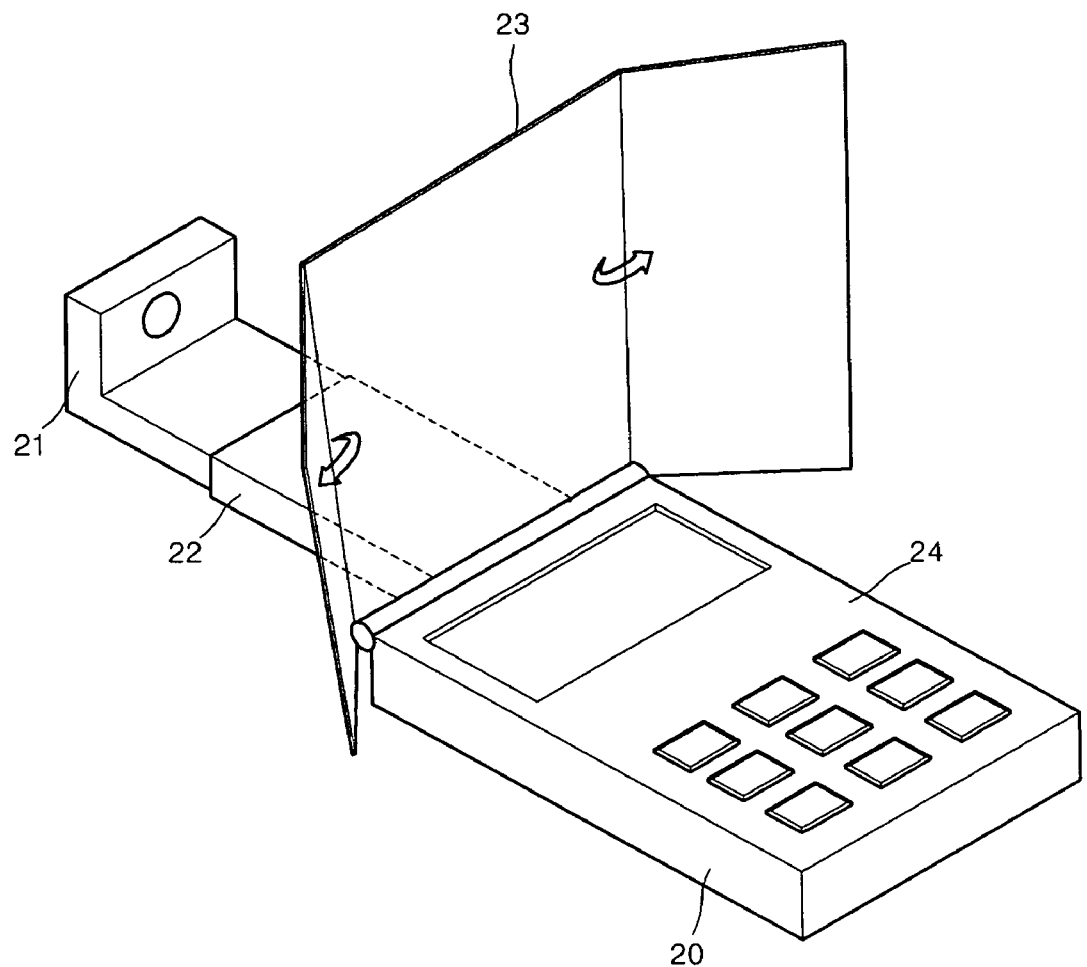
Figure 3A:
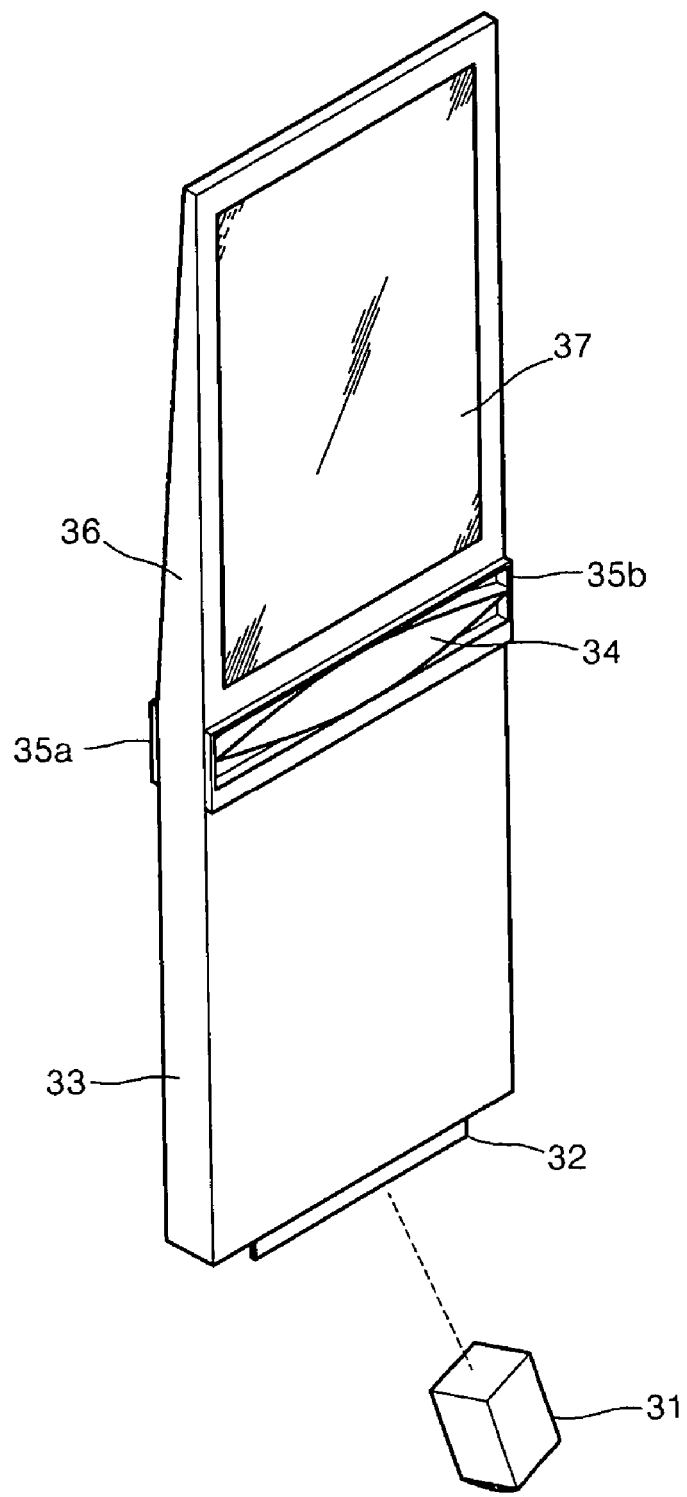
Figure 3B:
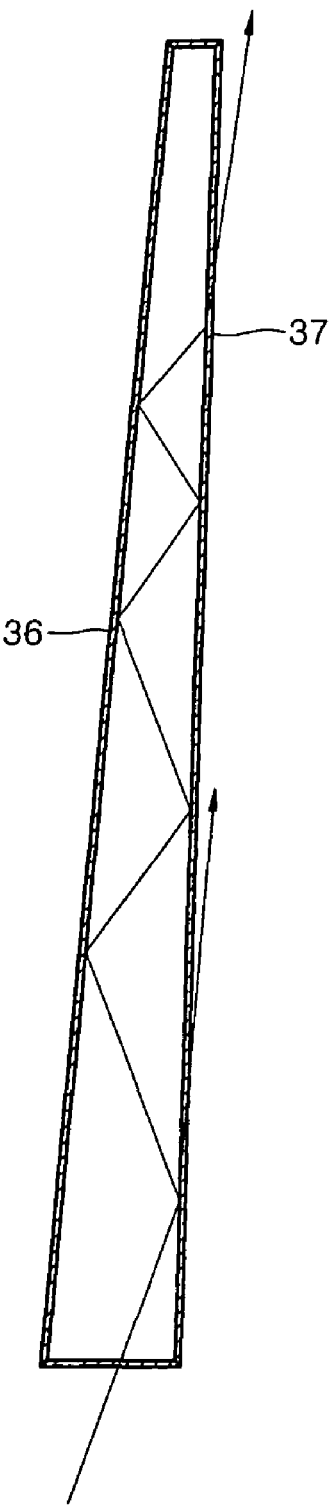
Figure 4:
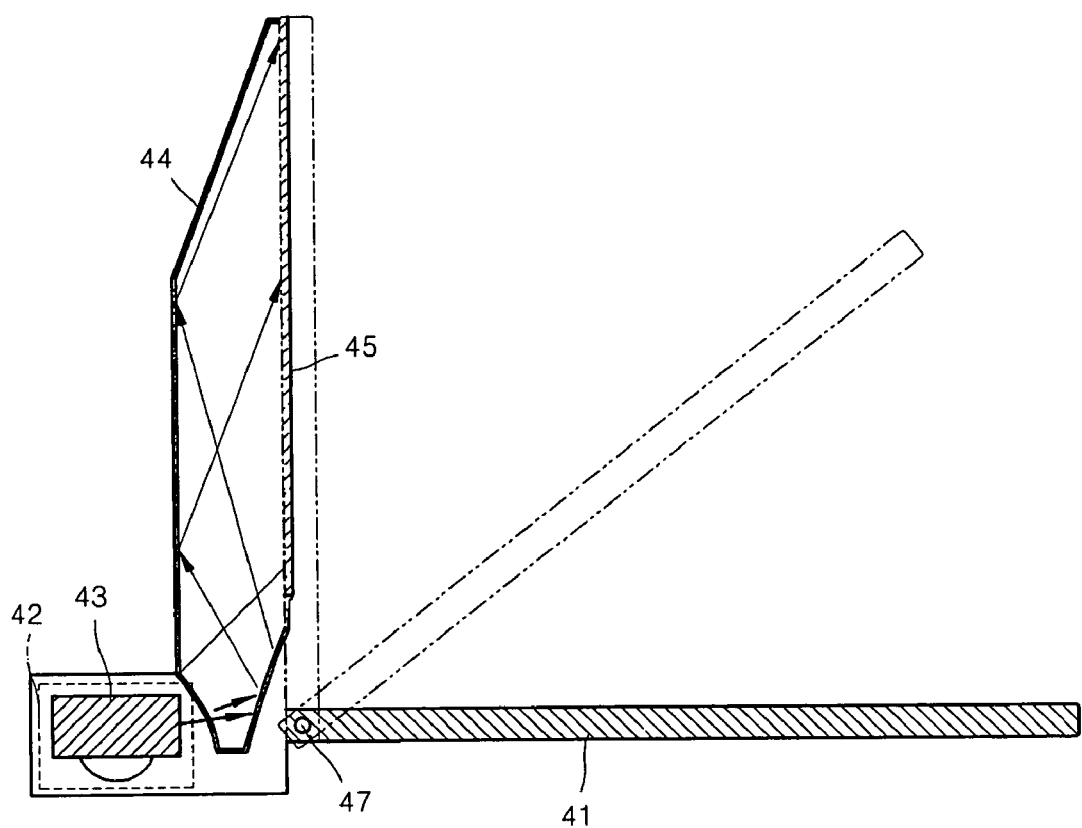
FIG. 4 is a side view of a compact rear projection display according to an exemplary embodiment of the present invention.

FIG. 4 is a side view of a compact rear projection display 40 according to an exemplary embodiment of the present invention. Referring to FIG. 4, the compact rear projection display 40 includes a main body unit 41, which generates image signals, an image providing unit 42, which forms and provides images according to image signals received from the main body unit 41, and a flat transparent light guide plate 44, on a surface of which a screen 45 is formed, which guides the image projected from the image providing unit 42 to be displayed on the screen 45.

Figure 5A:
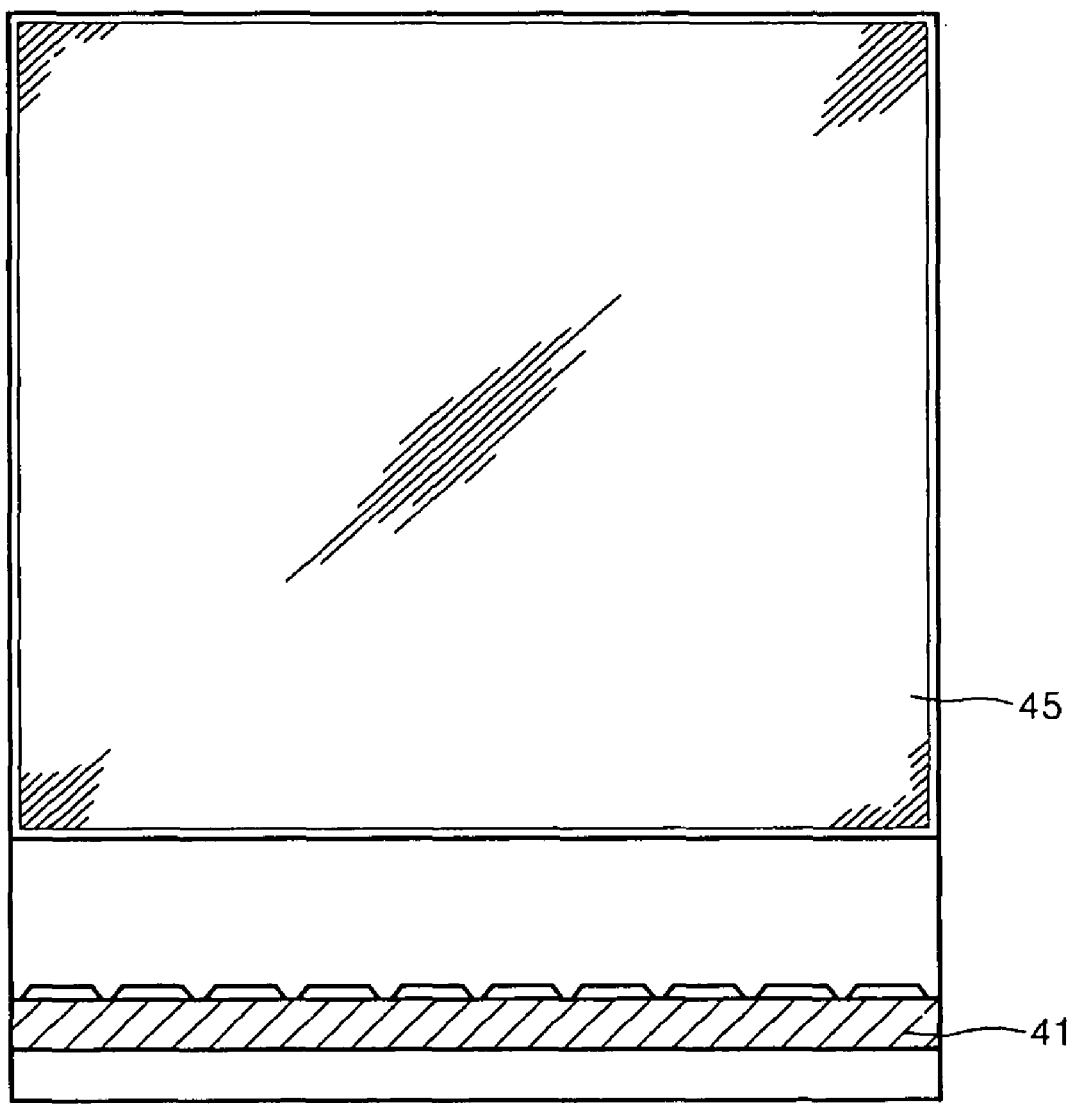
FIG. 5A is a front view of the compact rear projection display of FIG. 4.
Figure 5B:
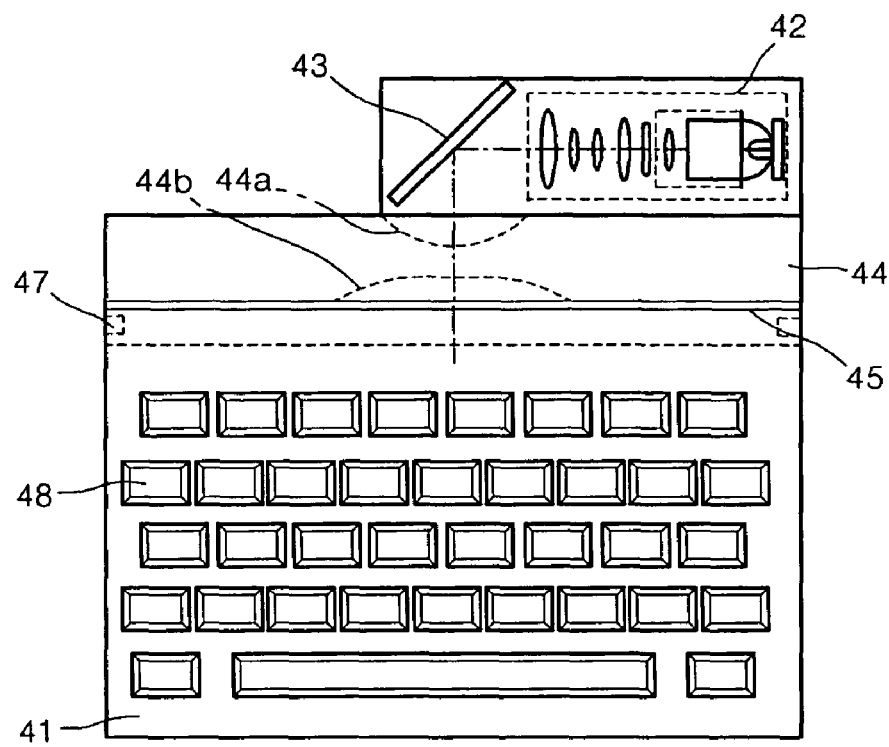
FIG. 5B is a top view of the compact rear projection display of FIG. 4.
Figure 5C:
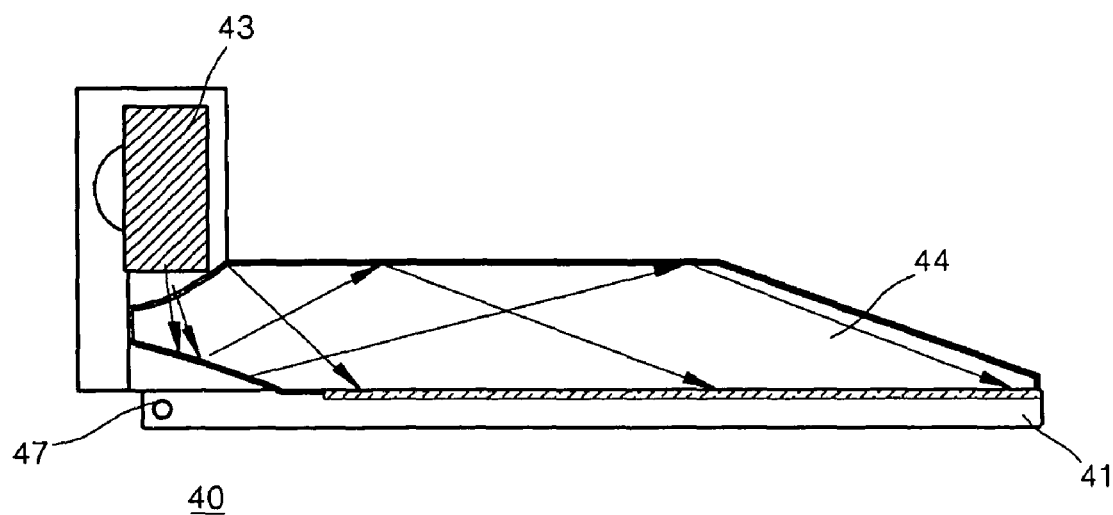
FIG. 5C illustrates a screen folded on a main body of the compact rear projection display of FIG. 4.

Several electronic circuits are mounted in the main body unit 41 to generate the image signals. As illustrated in FIG. 5B, a keypad 48 is arranged on a top surface of the main body unit 41 to allow a user to input information or commands. The main body unit 41 may be various mobile electronic devices, such as a cell phone, a PDA, a laptop computer, or a palmtop computer. As illustrated in FIG. 4, the main body unit 41 may be rotatably connected with the transparent light guide plate 44 by a hinge member 47. Accordingly, as illustrated in FIG. 5A, the screen 45 can be erected at a predetermined angle with respect to the main body unit 41 when used. When not used, as illustrated in FIG. 5C, the transparent light guide plate 44, on which the screen 45, is formed may be folded over the top surface of the main body unit 41.

As will be described later, the image providing unit 42 has the same structure and function as an image providing unit of a general projector or a general projection display. In other words, the image providing unit 42 receives the image signals from the main body unit 41, forms an image according to the received image signals, and projects the image. The image projected by the image providing unit 42 is incident on the transparent light guide plate 44 and displayed on the screen 45. As illustrated in FIG. 5B, when an optical axis of the image providing unit 42 is parallel to the surface of the transparent light guide plate 44, a folding mirror 43 can be disposed between the image providing unit 42 and the transparent light guide plate 44 so that the image formed and projected by the image providing unit 42 is incident on the transparent light guide plate 44.

The transparent light guide plate 44 guides the image incident from the image providing unit 42 to be displayed on the screen 45 formed on a surface of the transparent light guide plate 44. Accordingly, the transparent light guide plate 44 may be formed of glass or a plastic material having a high light transmittance such as polymethyl metacrylate (PMMA).

Figure 6:
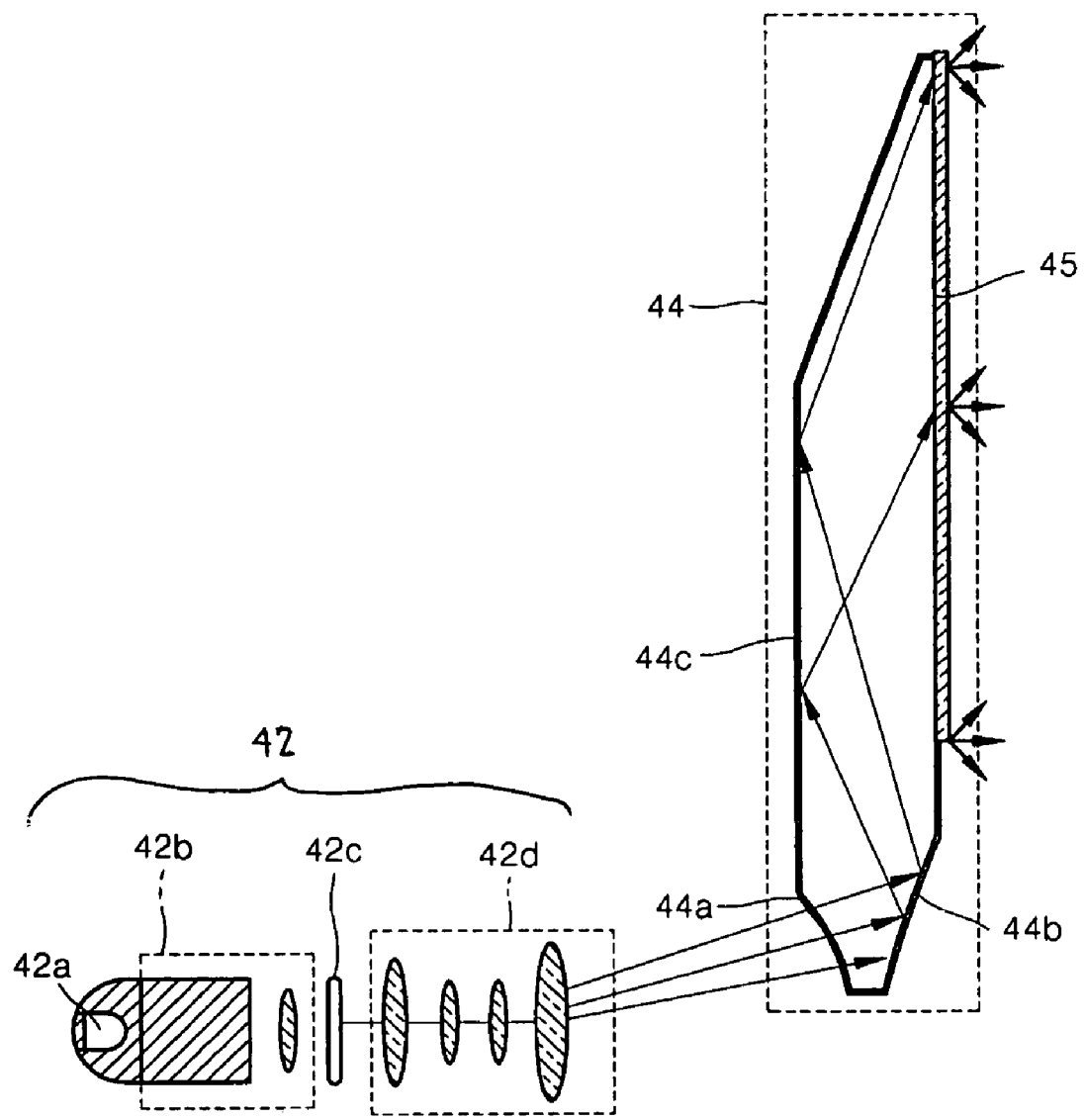
FIG. 6 illustrates the operation of the compact rear projection display of FIG. 4.

FIG. 6 illustrates the image providing unit 42 and the transparent light guide plate 44 in detail. As illustrated in FIG. 6, the image providing unit 42 includes a light source 42a an illumination optical system 42b, a light modulator 42c, and a projection optical system 42d. The light source 42a may be a small-sized light source such as a light emitting diode (LED), a laser diode (LD), a vertical cavity surface emitting laser (VCSEL), or a micro laser (ML). Light emitted from the light source 42a is incident on the illumination optical system 42b. As is well known in the art, the illumination optical system 42b includes a plurality of lenses and integrators to collimate and homogenize the incident light. Accordingly, the light transmitted through the illumination optical system 42b uniformly illuminates the light modulator 42c. The light modulator 42c modulates the incident light according to the image signals received from the main body unit 41 so as to form an image. The light modulator 42c may be a transparent active-matrix liquid crystal display (AMLCD), a liquid crystal on silicon (Lcos), a digital micro-mirror device (DMD), or an organic light emitting diode (OLED). An image formed by the light modulator 42c is projected by the projection optical system 42d, including a plurality of lenses, onto the transparent light guide plate 44. As described above, when the optical axis is parallel to a surface of the transparent light guide plate 44, the folding mirror 43 may be disposed next to the projection optical system 42d as illustrated in FIG. 5B.

Referring to FIG. 6, the image projected from the projection optical system 42d is incident on an image incidence surface 44a of the transparent light guide plate 44. As illustrated in FIG. 6, the image incidence surface 44a is formed either spherically or aspherically in a lower end of the transparent light guide plate 44. The image incidence surface 44a is spherical or aspherical not only in the vertical direction, as illustrated in FIG. 6, but also in the horizontal direction, as illustrated with a dotted line in FIG. 5B. Accordingly, the image projected from the projection optical system 42d is magnified by the image incidence surface 44a and enters the transparent light guide plate 44 through the image incidence surface 44a.

The image entering the transparent light guide plate 44 is reflected by a magnifying reflection surface 44b to a total internal reflection surface 44c of the transparent light guide plate 44. As illustrated in FIG. 6, the magnifying reflection surface 44b is formed by carving a surface of the transparent light guide plate 44 that faces the image incidence surface 44a and coating the carved surface with a reflection coating. Thus, the magnifying reflection surface 44b has a convex shape. The magnifying reflection surface 44b is aspherical to compensate for distortion of the image. Like the image incidence surface 44a, the magnifying reflection surface 44b is not only aspherical vertically as illustrated in FIG. 6 but also aspherical horizontally as illustrated with a dotted line of FIG. 5B. Thus, the image is magnified and reflected by the magnifying reflection surface 44b vertically and horizontally and is directed toward the total internal reflection surface 44c.

The image reflected by the magnifying reflection surface 44b and incident on the total internal reflection surface 44c is totally reflected by the total internal reflection surface 44c. As illustrated in FIG. 6, the total internal reflection surface 44c and the screen 45 are formed opposite to each other on the transparent light guide plate 44. Accordingly, the image totally reflected by the total internal reflection surface 44c is incident on the screen 45 and emitted through the screen 45 to the outside of the transparent light guide plate 44. As the image totally reflected by the reflection surface 44c is incident obliquely on the screen 45, the screen must be capable of uniformly diffusing the image in all directions. If the screen 45 is simply flat, the image is emitted obliquely from the screen and thus the viewing angle becomes too narrow to properly observe the image. Therefore, it is preferable that means for uniformly diffusing light, such as, a light diffusion plate, a total internal reflection (TIR) prism array, or a hologram pattern, is used as the screen 45. The screen 45 may be formed directly on the surface of the transparent light guide plate 44 or attached to the surface of the transparent light guide plate 44 using transparent light adhesive.

Unlike a conventional rear projection display including a plurality of components, a compact rear projection display 40, according to an exemplary embodiment of the present invention, can achieve rear projection using only the single transparent light guide plate 44. Thus, a compact rear projection display 40 can be easily manufactured at a reduced cost. Furthermore, unlike a conventional rear projection display, a compact rear projection display 40 has a simple structure, and there is no need to move a number of components to achieve rear projection. Thus, the possibility of breakdown is reduced, so that a rear projection display 40 is suitable to be used in portable devices. Also, a rear projection display 40 can be manufactured to be thin and compact.

Figure 7:
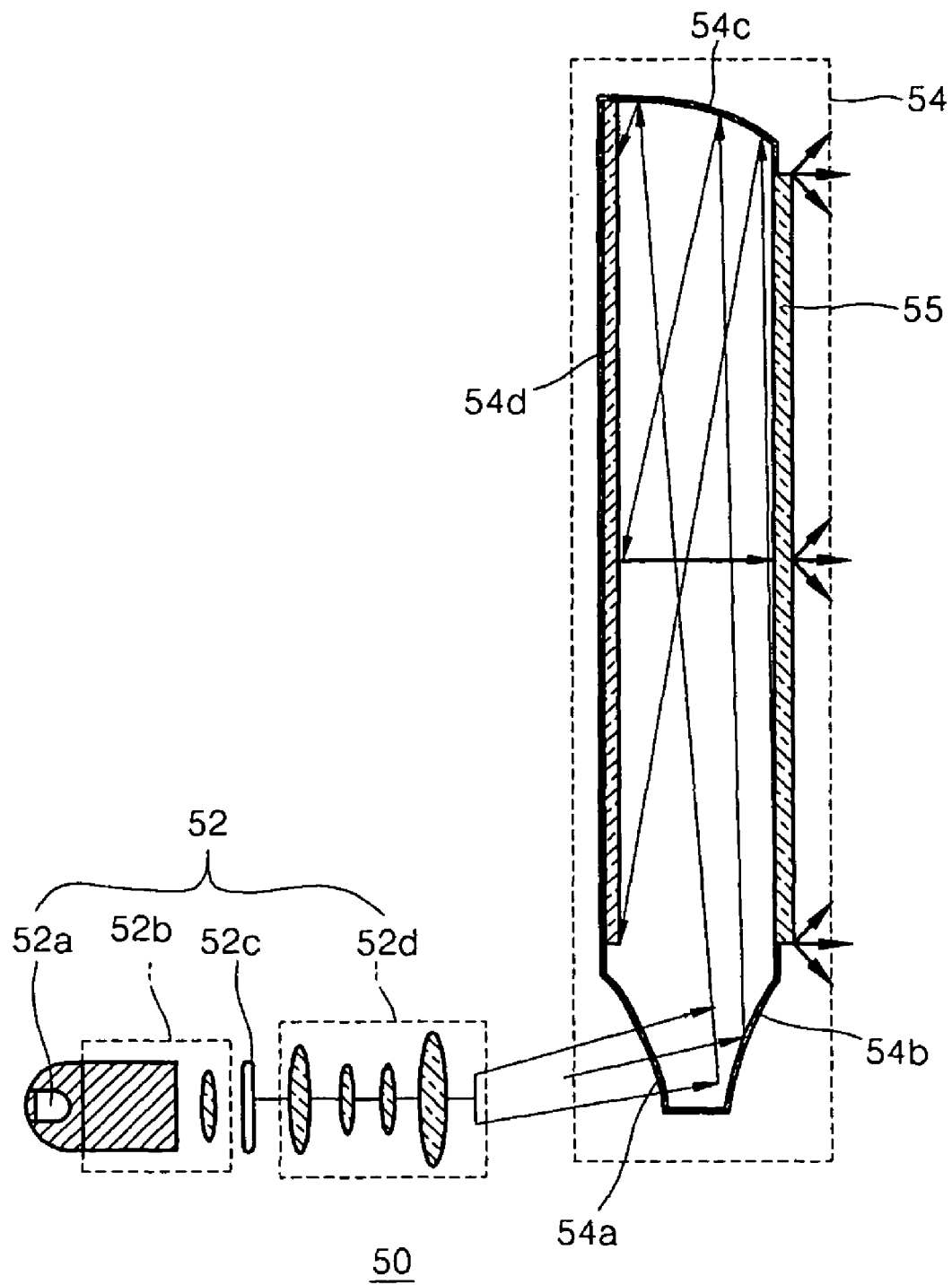
FIG. 7 is a side view of a compact rear projection display according to another exemplary embodiment of the present invention.

FIG. 7 is a schematic view of a compact rear projection display 50 according to another exemplary embodiment of the present invention. In FIG. 7, only an image providing unit 52 and a transparent light guide plate 54 are illustrated, as in FIG. 6. Similar to the previous embodiment, a main body unit (not shown) may be a cell phone, a PDA, a laptop computer, or a palmtop computer, and may be pivotably connected to the transparent light guide plate 54 through a hinge member (not shown).

As illustrated in FIG. 7, the image providing unit 52 has the same structure as the image providing unit 42 of FIG. 6. More specifically, the image providing unit 52 includes a light source 52a; an illumination optical system 52b, which uniformly irradiates the light emitted from the light source 52a to a light modulator 52c; a light modulator 52c, which modulates the light emitted from the light source 52a according to image signals received from the main body unit so as to form an image; and a projection optical system 52d, which projects the image formed in the light modulator 52c. Though not illustrated in FIG. 7, as in the previous embodiment, a folding mirror may be disposed next to the projection optical system 52d when an optical axis of the image providing unit 52 is parallel to the surface of the transparent light guide plate 54.

The image projected from the projection optical system 52d is incident on an image incidence surface 54a of the transparent light guide plate 54. As illustrated in FIG. 7, the image incidence surface 54a is formed either spherically or aspherically in a lower end of the transparent light guide plate 54. The image entered into the transparent light guide plate 54 through the image incidence surface 54a is incident on a first reflection surface 54b facing the image incidence surface 54a. As illustrated in FIG. 7, the first reflection surface 54b is formed by carving a surface of the transparent light guide plate 54 that faces the image incidence surface 54a and coating the carved surface using reflection coating. Thus, the first reflection surface 44b is convexly aspherical to compensate for distortion of the image.

In the rear projection display 50, the image incident on the first reflection surface 54b is reflected to a second reflection surface 54c in an upper end of the transparent light guide plate 54. As illustrated in FIG. 7, the first reflection surface 54b and the second reflection surface 54c face each other at the ends of the transparent light guide plate 54. The second reflection surface 54c reflects the incident image to a mirror array 54d formed on a surface of the transparent light guide plate 54 that faces the screen 55. To this end, the second reflection surface 54c may be concave and aspherical.

Figure 8:
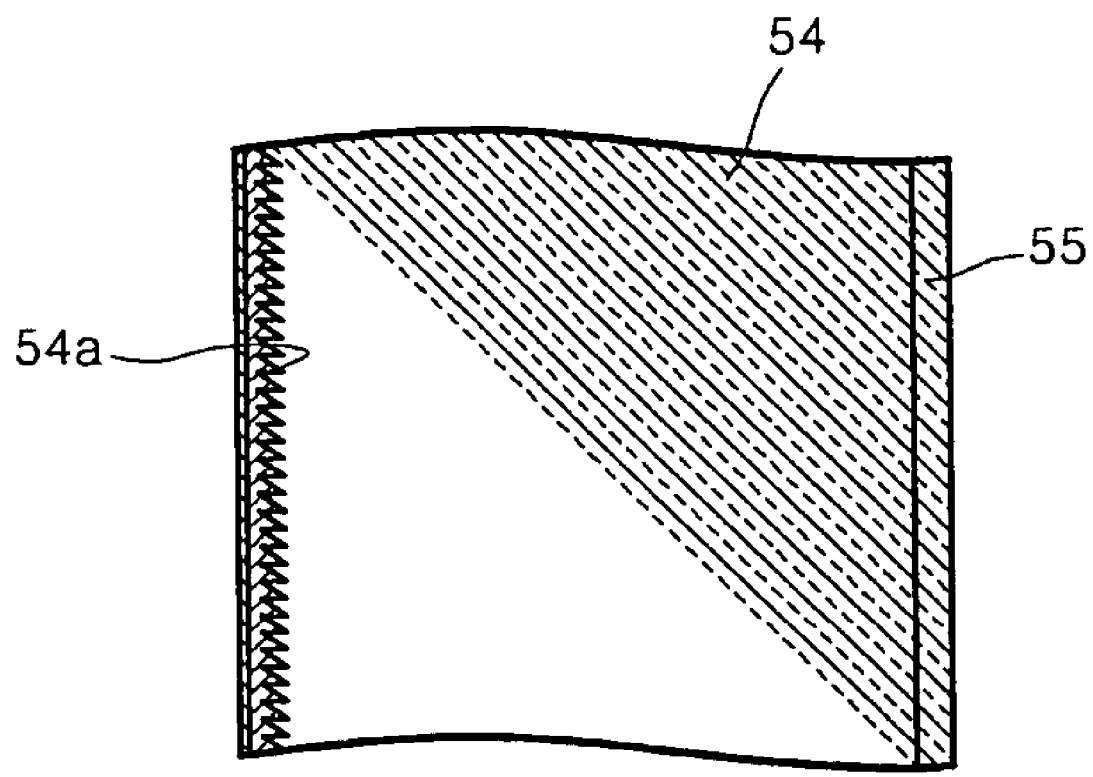
FIG. 8 illustrates the structure of a mirror array formed on a transparent light guide plate of the compact rear projection display of FIG. 7.

The mirror array 54d of the transparent light guide plate 54 reflects an image received from the second reflection surface 54c to the screen 55. The reflected image is perpendicular to the screen 55. To reflect the received image in a direction perpendicular to the screen 55, the mirror array 54d may be a saw-like mirror array or a Fresnel lens type mirror array as illustrated in FIG. 8. That is, the mirror array 54*d* may include a plurality of inclined micro mirrors arranged side by side. Thus, unlike in the rear projection display 40 in which an image is obliquely incident on the screen 45, the image is incident on the screen 55 almost at a right angle in the present embodiment. Accordingly, instead of using a light diffusion plate, a total internal reflection prism array, or a hologram pattern, the screen 55 may be a lenticular screen or a microlens screen. As in the previous embodiment of FIG. 4, the screen 55 may be formed directly on a surface of the transparent light guide plate 54 or attached on the transparent light guide plate 54 using transparent light adhesive.

As described above, a rear projection display according to the present invention can sufficiently achieve rear projection using only a single transparent light guide plate in contrast with conventional rear projection displays that each include a plurality of aligned components. Accordingly, a rear projection display according to the present invention can be easily assembled and manufactured at low costs. Furthermore, compared to conventional rear projection displays, a rear projection display of the present invention has a simple structure, and a movement of a number of components for rear projection does not occur. Thus, mechanical problems are less likely to happen and the rear projection display of the present invention can be made thin and compact and used for portable devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rear projection display comprising:
a main body unit which generates image signals;
an image providing unit which forms and projects an image according to the image signals received from the main body unit; and
a transparent light guide plate, and a screen formed at a side thereof, wherein the image received from the image providing unit is guided to the screen by the transparent light guide plate,
the transparent light guide plate comprising a transparent image incidence surface through which the image projected by the image providing unit is incident, and a magnifying reflection surface facing the transparent image incidence surface and, which magnifies and reflects the image incident through the transparent image incidence surface,
wherein the magnifying reflection surface is convex.

2. The rear projection display of claim 1, wherein the transparent light guide plate further comprises:
a total reflection surface, facing the screen and parallel to the screen, which totally internally reflects the image reflected by the magnifying reflection surface toward the screen.

3. The rear projection display of claim 1, wherein the transparent image incidence surface and the magnifying reflection surface face each other and are formed at one end of the transparent light guide plate.

4. The rear projection display of claim 3, wherein the transparent image incidence surface is spherical or aspherical.

5. The rear projection display of claim 3, wherein the magnifying reflection surface is aspherical.

6. The rear projection display of claim 1, wherein the screen is formed directly on a surface of the transparent light guide plate or is attached to the surface of the transparent light guide plate with an adhesive member, and
the screen is one of a light diffusion plate, a total internal reflection (TIR) prism array, and a hologram pattern.

7. The rear projection display of claim 1, wherein the image providing unit comprises:
a light source;
a light modulator which modulates light emitted from the light source according to an image signal received from the main body unit to form an image;
an illumination optical system disposed between the light source and the light modulator, which uniformly irradiates the light emitted from the light source to the light modulator; and
a projection optical system which projects the image formed in the light modulator.

8. The rear projection display of claim 7, wherein the image providing unit further comprises a folding mirror which reflects the image projected by the projection optical system to the transparent image incidence surface of the transparent light guide plate.

9. The rear projection display of claim 1, further comprising a connector, which rotatably connects the transparent light guide plate to the main body unit, thereby enabling a first position in which the transparent light guide plate is at a predetermined angle with respect to the main body unit, and a second position in which the transparent light guide plate is folded over a top surface of the main body unit.

10. The rear projection display of claim 9, wherein the main body unit is one of a cell phone, a personal digital assistant (PDA), a laptop computer, or a palmtop computer.

11. The rear projection display of claim 1, wherein the transparent image incidence surface magnifies the image.

12. The rear projection display of claim 1, wherein the magnifying reflection surface is aspherical along a horizontal direction and a vertical direction.

13. A rear projection display comprising:
a main body unit which generates image signals;
an image providing unit, which forms an image according to the image signals received from the main body unit; and
a flat transparent light guide plate,
wherein the transparent light guide plate comprises:
a screen disposed at a surface of the transparent light guide plate,
a transparent image incidence surface, disposed at a first end of the transparent light guide plate, through which the image projected by the image providing unit is incident;
a first reflection surface, facing the transparent image incidence surface at the first end of the transparent light guide plate, which reflects the image incident through the transparent image incidence surface;
a second reflection surface, facing the first reflecting surface and disposed at a second end of the transparent light guide plate, which reflects the image reflected by the first reflection surface; and
a mirror array, facing the screen, which reflects the image reflected by the second reflection surface to the screen, whereby the image is incident on the screen at a right angle thereto.

14. The rear projection display of claim 13, wherein the transparent image incidence surface is spherical or aspherical.

15. The rear projection display of claim 13, wherein the first and second reflection surfaces are aspherical, the first reflection surface is convex, and the second reflection surface is concave.

16. The rear projection display of claim 13, wherein the mirror array facing the screen is one of a saw-shaped mirror array and a Fresnel lens type mirror array.

17. The rear projection display of claim 13, wherein the screen is directly formed on a surface of the transparent light guide plate or is attached to the surface of the transparent light guide plate with an adhesive member, and the screen is one of a light diffusion plate, a TIR prism array, a hologram pattern, a lenticular screen, and a micro lens screen.

18. The rear projection display of claim 13, wherein the image providing unit comprises:

a light source;

a light modulator which modulates light emitted from the light source according to image signals received from the main body unit to form an image;

an illumination optical system disposed between the light source and the light modulator, which uniformly irradiates the light emitted from the light source to the light modulator; and a projection optical system which projects the image formed in the light modulator.

19. The rear projection display of claim 18, wherein the image providing unit further comprises a folding mirror which reflects the image projected from the projection optical system to the transparent image incidence surface of the transparent light guide plate.

20. The rear projection display of claim 13, further comprising a connector, which rotatably connects the transparent light plate to the main body unit, thereby enabling a first position in which the transparent light guide plate is at a predetermined angle with respect to the main body unit, and a second position in which the transparent light guide plate is folded over a top surface of the main body unit.

21. The rear projection display of claim 20, wherein the main body unit is one of a cell phone, a PDA, a laptop computer, and a palmtop computer.

22. The rear projection display of claim 13, wherein the transparent image incidence surface magnifies the image.

\* \* \* \* \*